US 6,725,379 B1

United States Patent
Dailey (10) Patent No.: US 6,725,379 B1
(45) Date of Patent: Apr. 20, 2004

(54) STOLEN COMPUTER DETECTION AND PROTECTION

(75) Inventor: James E. Dailey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/372,551

(22) Filed: Aug. 11, 1999

(51) Int. Cl.$^7$ ................................................ G06F 11/30
(52) U.S. Cl. ..................................................... 713/201
(58) Field of Search ............................... 713/201, 200, 713/151, 155, 156, 157, 158; 380/270

(56) References Cited

U.S. PATENT DOCUMENTS 5,578,991 A   11/1996   Scholder .................... 340/571
5,691,928 A   11/1997   Okaya et al. ............ 364/709.05
5,748,084 A    5/1998   Isikoff ........................ 340/568
6,300,863 B1 * 10/2001  Cotichini et al. ............ 340/5.8

OTHER PUBLICATIONS

American National Standard for Information Systems standard AT Attachment–3 Interface—(ATA–3), ANSI X3.298–1997 (X3T13/2008D, Revision 7b Jan. 27, 1997).

* cited by examiner

Primary Examiner—Matthew Smithers
(74) Attorney, Agent, or Firm—Baker Botts L.L.P.

(57) ABSTRACT

A stolen computer detection and protection method and system. The method and system detect a communication to at least a first data processing system from at least a second data processing system. In response to detection of the communication from the at least a second data processing system, determination is made as to whether the at least a second data processing system is stolen. If it is determined that the at least a second data processing system is stolen, the at least a second data processing system is disabled.

47 Claims, 4 Drawing Sheets

STOLEN COMPUTER DETECTION AND PROTECTION

BACKGROUND OF THE INVENTION

1. Field of the Invention

The present invention relates, in general, to a method and system to be utilized in data processing systems.

2. Description of the Related Art

Data processing systems are systems that manipulate, process, and store data and are notorious within the art. Personal computer systems, and their associated subsystems, constitute well known species of data processing systems.

Personal computer systems typically include a motherboard for mounting at least one microprocessor and other application specific integrated circuits (ASICs), such as memory controllers, input/output (I/O) controllers, and the like. Most motherboards include slots for additional adapter cards to provide additional function to the computer system. Typical functions that a user might add to a computer include additional microprocessors, additional memory, fax/modem capability, sound cards, graphics cards, or the like. The slots included on the motherboard generally include in-line electrical connectors having electrically conductive lands which receive exposed tabs on the adapter cards. The lands are connected to wiring layers, which in turn are connected to a bus that allows the cards to communicate with the microprocessor or other components in the system.

A personal computer system may include many different types of buses to link the various components of the system. Examples of such buses are a "local bus" which connects one or more microprocessors to the main memory, an Industry Standard Architecture (ISA) bus for sound cards and modems, a Universal Serial Bus (USB) for pointing devices, scanners, and digital cameras, a Fire Wire (IEEE-1394) for digital video cameras and high-speed storage drives, and a Peripheral Component Interconnect (PCI) bus for graphics cards, SCSI adapters, sound cards, and other peripheral devices such as isochronous devices, network cards, and printer devices.

One particularly popular type of personal computer system is the portable computer system (e.g., laptop, notebook, sub-notebook, and palm-held computer systems). Portable computer systems allow stand-alone computing and typically have their own power-supplies, modems, and storage devices.

Portable computer systems, due to their flexibility and power, are particularly popular with professional corporate users (e.g., engineers, programmers, accountants, financial analysts, etc.). It has become very common for such professional corporate users to carry large amounts of highly valuable and secret corporate data (e.g., a new microprocessor design) within their personal computer systems. Such corporate data is typically worth a great deal of money.

Personal computer systems, due to their popularity, are increasingly the targets of theft. While the personal computer systems themselves are very valuable, as far as the professional corporate user is concerned, it is the data itself that is the most valuable item in the personal computer system. Typically, when a personal computer system is stolen, there are at least two concerns: (1) that the personal computer itself might be misused, and (2) that the data contained within the personal computer might be exposed or make its way into the wrong hands. Note that while the foregoing has focused on personal computer systems, those skilled in the art will recognize that the same concerns also apply to the theft of any computer system.

It is therefore apparent that a need exists in the art for making a stolen computer system substantially unusable and/or making data in the stolen computer substantially inaccessible.

SUMMARY OF THE INVENTION

A system and method have been invented which make a stolen computer system substantially unusable and/or make data in the stolen computer substantially inaccessible. The method and system detect a communication to at least a first data processing system from at least a second data processing system. In response to detection of the communication from the at least a second data processing system, determination is made as to whether the at least a second data processing system is stolen. If it is determined that the at least a second data processing system is stolen, the at least a second data processing system is disabled.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below. dr

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention(s) described herein. The description is intended to be illustrative and should not be taken to be limiting. In addition, the following detailed description has been divided into sections (e.g., sections I–II) in order to highlight the invention(s) described herein; however, those skilled in the art will appreciate that such sections are merely for illustrative focus, and that the invention(s) herein disclosed typically draw support from multiple sections. Consequently, it is to be understood that the division of the detailed description into separate sections is merely done as an aid to understanding and is in no way intended to be limiting.

I. Environment

Figure 1:
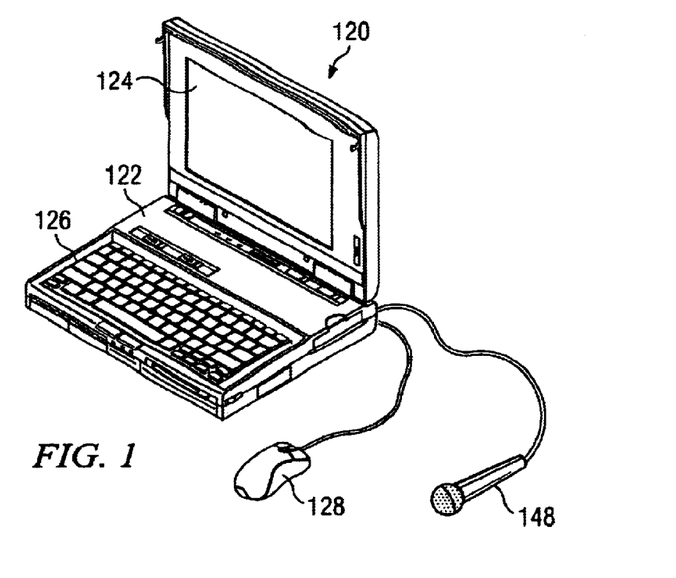
FIG. 1 depicts a pictorial representation of a data-processing system which can be utilized in accordance with the method and system of an illustrative embodiment of the present invention.

With reference now to the figures and in particular with reference now to FIG. 1, there is depicted a pictorial representation of a data-processing system which can be utilized in accordance with the method and system of an illustrative embodiment of the present invention. A graphical user interface system and method can be implemented with the data-processing system depicted in FIG. 1. A data processing system 120 is depicted which includes a system unit 122, a video display device 124, a keyboard 126, a mouse 128, and a microphone 148. Data processing system 120 may be implemented utilizing any suitable computer such as an IBM-compatible or an Apple-compatible computer.

Figure 2:
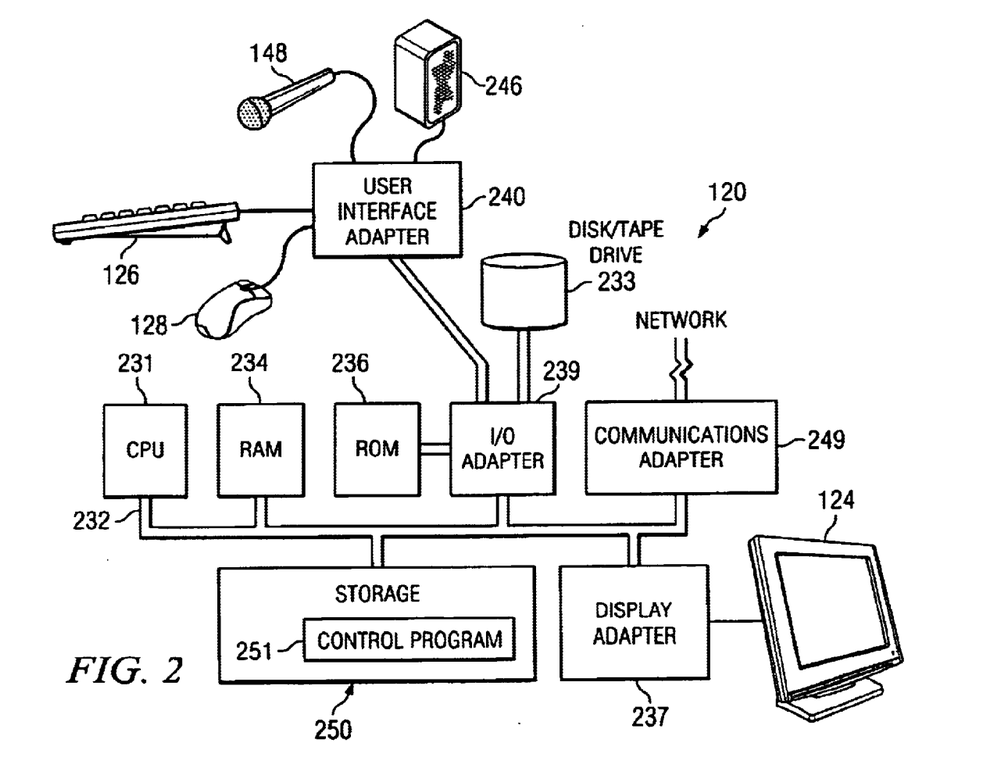
FIG. 2 illustrates a representative hardware environment, which incorporates a graphical user interface, which can be utilized in accordance with the method and system of an illustrative embodiment of the present invention.

FIG. 2 is an illustration of a representative hardware environment, which incorporates a graphical user interface. FIG. 2 depicts selected components in data processing system 120 in which an illustrative embodiment of the present invention may be implemented. Data processing system 120 includes a Central Processing Unit ("CPU") 231, such as a conventional microprocessor, and a number of other units interconnected via system bus 232. Such components and units of data processing system 120 can be implemented in a system unit such as unit 122 of FIG. 1. Data processing system 120 includes random-access memory ("RAM") 234, read-only memory ("ROM") 236, display adapter 237 for connecting system bus 232 to video display device 124, and I/O adapter 239 for connecting peripheral devices (e.g., disk and tape drives 233) to system bus 232. Video display device 124 is the visual output of data processing system 120, which can be a CRT-based video display well-known in the art of computer hardware. However, with a portable or notebook-based computer, video display device 124 can be replaced with an LCD-based or a gas plasma-based flat-panel display. Data processing system 120 further includes user interface adapter 240 for connecting keyboard 126, mouse 128, speaker 246, microphone 148, and/or other user interface devices, such as a touch screen device (not shown), to system bus 232 through I/O adapter 239. Communications adapter 249 connects data processing system 120 to a data-processing network.

Any suitable machine-readable media may retain the graphical user interface, such as RAM 234, ROM 236, a magnetic diskette, magnetic tape, or optical disk (the last three being located in disk and tape drives 233). Any suitable operating system and associated graphical user interface (e.g., Microsoft Windows) may direct CPU 231. Other technologies can also be utilized in conjunction with CPU 231, such as touch-screen technology or human voice control. In addition, data processing system 120 includes a control program 251 which resides within computer storage 250. Control program 251 contains instructions that when executed on CPU 231 carries out application program (e.g., videoconferencing software) operations.

Those skilled in the art will appreciate that the hardware depicted in FIG. 2 may vary for specific applications. For example, other peripheral devices such as optical disk media, audio adapters, video cameras such as those used in videoconferencing, or programmable devices, such as PAL or EPROM programming devices well-known in the art of computer hardware, and the like may be utilized in addition to or in place of the hardware already depicted.

Those skilled in the art will recognize that data processing system 120 can be described in relation to data processing systems which perform essentially the same functionalities, irrespective of architectures. As an example of such, an alternative partial architecture data processing system 120 is set forth in FIG. 3.

Figure 3:
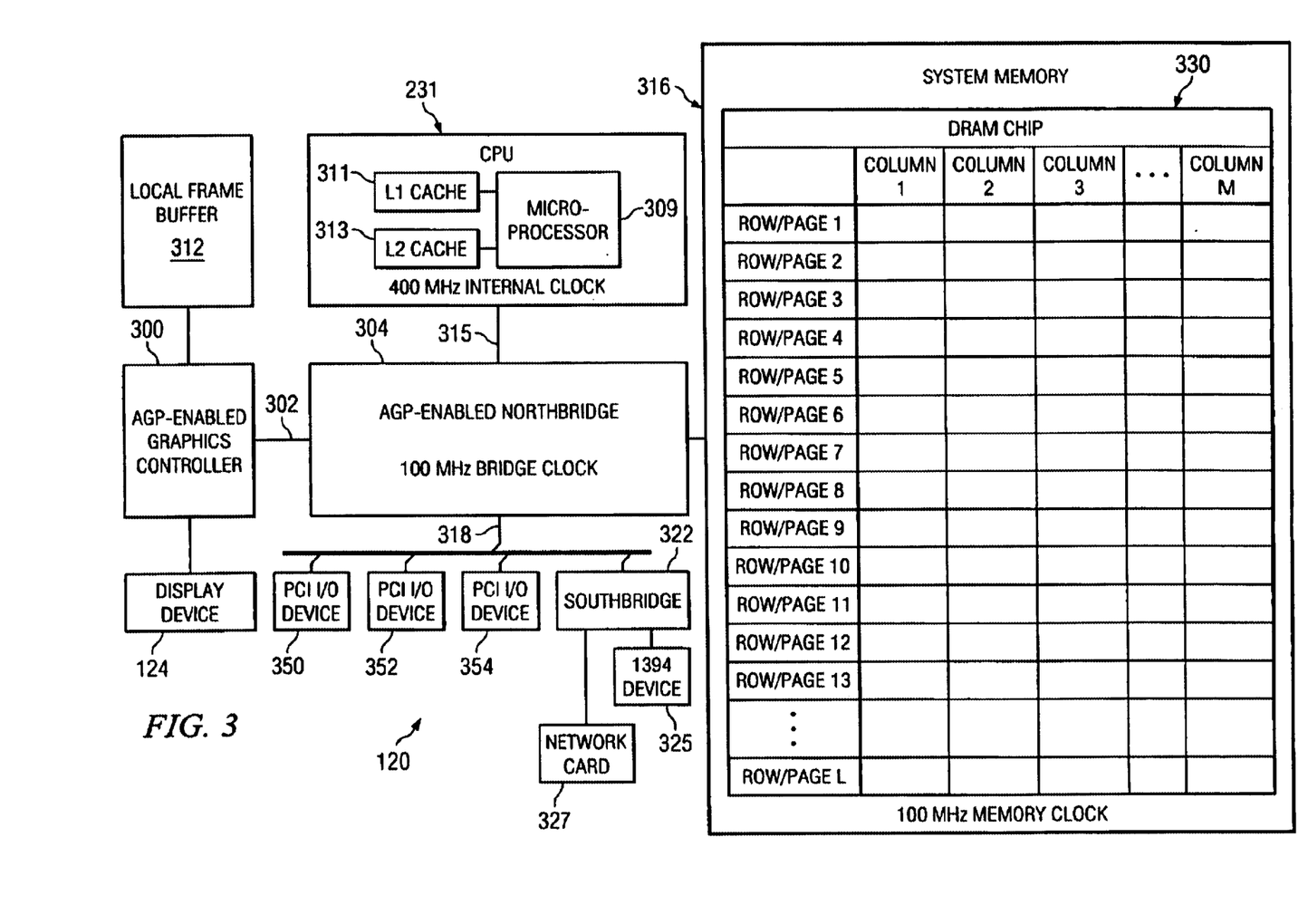
FIG. 3 shows a high-level component diagram depicting a data processing system which illustrates another environment wherein one or more embodiments of the present invention may be practiced.

Referring now to FIG. 3, shown is a high-level component diagram depicting a partial data processing system 120 which illustrates another environment wherein one or more embodiments of the present invention may be practiced. Shown are AGP-enabled graphics controller 300, AGP interconnect 302 (a data bus), and AGP-enabled Northbridge 304. Not shown, but deemed present is an AGP-enabled operating system. The term AGP-enabled is intended to mean that the so-referenced components are engineered such that they interface and function under the standards defined within the AGP interface specification (Intel Corporation, *Accelerated Graphics Port Interface Specification*, Revision 1.0 (Jul. 31, 1996)). Further depicted are video display device 124, local frame buffer 312, Central Processing Unit (CPU) 231 (wherein are depicted microprocessor 309, LI Cache 311, and L2 Cache 313), CPU bus 315, system memory 316, Peripheral Component Interconnect (PCI) bus 318, various PCI Input-Output (I/O) devices 350, 352, and 354, Southbridge 322, 1394 Device 325, and network card 327.

The foregoing components and devices are used herein as examples for sake of conceptual clarity. As for (non-exclusive) example, CPU 231 is utilized as an exemplar of any general processing unit, including but not limited to multiprocessor units; CPU bus 315 is utilized as an exemplar of any processing bus, including but not limited to multiprocessor buses; PCI devices 350–354 attached to PCI bus 318 are utilized as an exemplar of any input-output devices attached to any I/O bus; AGP Interconnect 302 is utilized as an exemplar of any graphics bus; AGP-enabled graphics controller 300 is utilized as an exemplar of any graphics controller; Northbridge 304 and Southbridge 322 are utilized as exemplars of any type of bridge; 1394 device 325 is utilized as an exemplar of any type of isochronous source; and network card 327, even though the term "network" is used, is intended to serve as an exemplar of any type of synchronous or asynchronous input-output cards. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface)

through which the two different types of buses are connected. This is one of the functions of AGP-enabled Northbridge 304, Southbridge 322, and other bridges shown in that it is to be understood that such can translate and coordinate between various data buses and/or devices which communicate through the bridges.

II. Detecting Disabling Stolen Data Processing System

Figure 4:
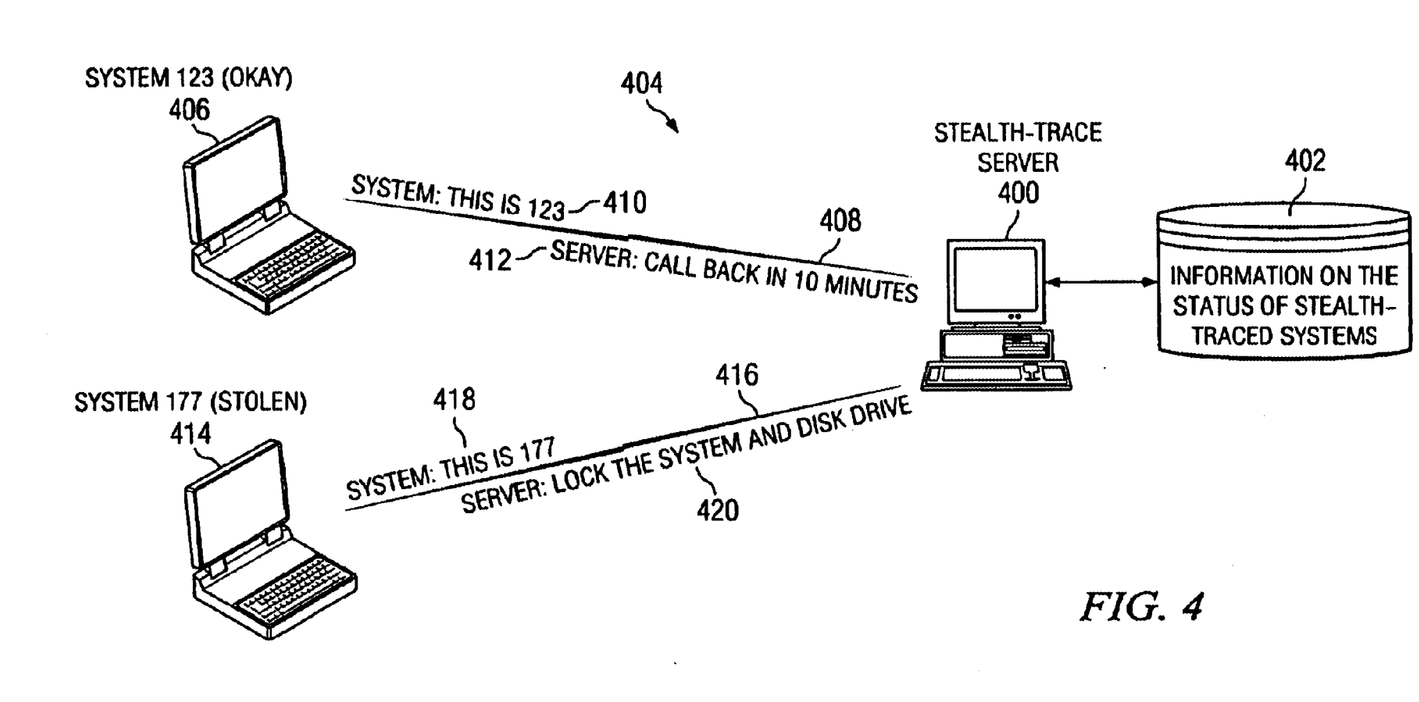
FIG. 4 shows a pictographic diagram which illustrates the detection and disablement of a stolen computer system.

With reference now to FIG. 4, shown is a pictographic diagram which illustrates the detection and disablement of a stolen computer system. Illustrated is stealth-trace server 400. Shown contained within stealth-trace server 400 is stealth-trace database 402, which maintains a listing of computers (e.g., the names and/or unique numeric identifies of computers) tracked by stealth-trace system 404. Shown for sake of illustration is that data processing system 123 406 secretly[1] (that is, without a person using data processing system 123's knowledge) sends, over data link 408 (which can be a telephone line, an internet connection, or a wireless connection, etc.), a "checking-in" message 410 (e.g., "this is data processing system 123"). In response to "checking-in" message 410, depicted is that stealth-trace server 400 checks stealth-trace database 402 for a "status" listing for data processing system 123 406. Insofar as the status of data processing system 123 406 is shown as "okay," the status listing for data processing system 123 406 will be "not stolen." Accordingly, illustrated is that in response to "checking-in" message 410, stealth-trace server 400 sends "continue functioning normally" message 412 to data processing system 123 406 (e.g., "call back in 10 minutes").

Further shown for sake of illustration is that system 177 414 (that is, without a person using data processing system 117's knowledge) sends, over data link 416 (which can be a telephone line, an internet connection, or a wireless connection, etc.), "checking-in" message 418 (e.g., "this is data processing system 117"). In response to "checking-in" message 418, depicted is that stealth-trace server 400 checks stealth-trace database 402 for a "status" listing for computer 177 414. Insofar as the status of data processing system 117 414 is shown as "stolen," the status listing for data processing system 117 414 will be "stolen." Accordingly, illustrated is that in response to "checking in" message 418, stealth-trace server 400 sends "disable yourself" message 420 (e.g., "lock the system and disk drive") to data processing system 117 414.

Figure 5:
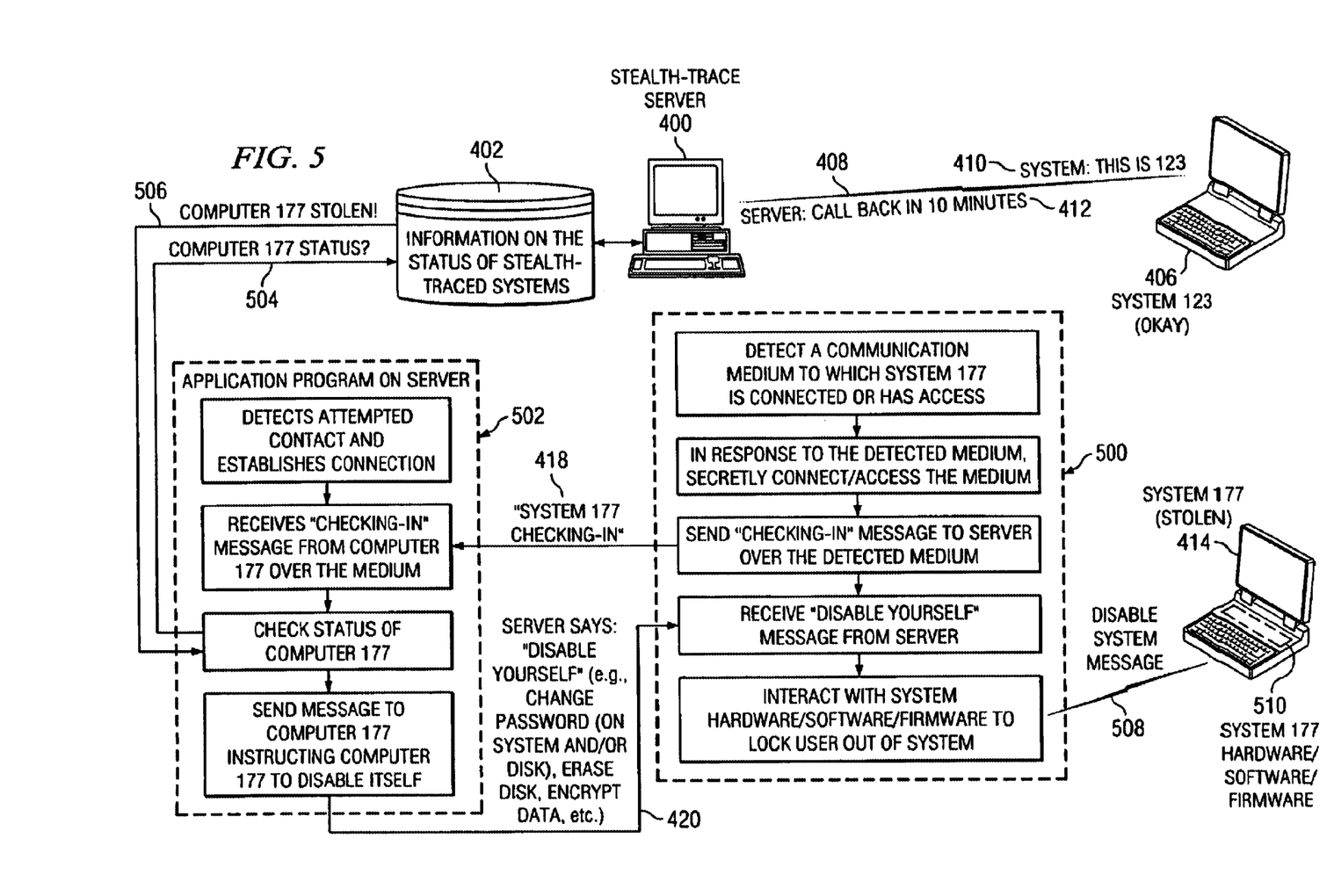
FIG. 5 depicts a pictographic diagram which illustrates the detection and disablement of a stolen computer system in different detail.

Referring now to FIG. 5, depicted is a pictographic diagram which illustrates the detection and disablement of a stolen computer system in different detail. Illustrated is that running on system 177 414 is stealth-trace application program 500. Depicted is that stealth-trace application program (which, in one embodiment, is implemented via a modified Basic Input-Output (BIOS) system) 500 detects a communication medium (e.g., telephone land line, TCP/IP network, or cellular telephone) to which system 177 414 is connected. For example, if a user has connected system 177 414 to a telephone line and then left system 177 414 unattended, stealth-trace application program 500 would detect the presence of the unused phone line (which may be land line or wireless); alternatively, if a user has substantially immediate access to an internet service provider and is utilizing the internet, the system would detect the presence of the TCP/IP connection. Those skilled in the art will recognize that detection of other types of media are also within the spirit of the foregoing, such as connection to a SONET network, ATM network, or LAN.

In response to the medium of communication detected, system 177 414 will then secretly (i.e., without user knowledge) initiate the appropriate devices and/or protocols for using the detected medium. For example, if the medium detected were an unused telephone (e.g., wired or wireless) line, system 177 414 would cause its modem (not shown) to secretly and silently dial a number appropriate to stealth-trace server 400. Thereafter, once stealth-trace server 400 has answered the call over the telephone line, system 177 414 and stealth-trace server 400 can communicate using any one of several protocols well known to those in the art. Alternatively, if the medium detected were an internet connection, such as a TCP/IP connection, system 177 414 would secretly initiate communication with stealth-trace server 400 utilizing TCP/IP. Those skilled in the art will recognize that other types of connections are within the spirit of the foregoing, such as connection over a SONET network, an ATM network, or a LAN.

Thereafter, stealth-trace server 400 detects the event of application program 500 attempting to contact stealth-trace server 400 over the medium selected by application program 500. Stealth-trace server 400 responds as appropriate to the medium over which application program 500 is attempting to establish communication. That is, a connection appropriate to the medium over which application program 500 is signaling is established.

Once a connection appropriate to the detected medium is established, application program 500 sends (that is, without a person using system 177's knowledge) "checking-in" message 418 over a data link (e.g., data link 416 of FIG. 4) to stealth-trace server 400. This is generally accomplished by application program 500 running in a fashion such that its presence and execution is not visible to a human user utilizing data processing system 117 414, Illustrated is that running on stealth-trace server 400 is application program 502. Shown is that application program 502 receives "checking-in" message 418 from computer 177 414. Depicted is that in response to "checking-in" message 418 application program 502 makes status of computer 177 query 504 of stealth-trace database 402.

Shown is that stealth-trace database 402 responds to status of computer 177 query 504 with "computer 177 stolen" message 506. (Stealth-trace database 402 becomes aware of an alert (not shown), typically generated by a user (not shown) calling into stealth-trace server 400 and alerting the system to the fact that a computer has been stolen (e.g., "computer 177 has been stolen, so please disable it when it calls in.") Thereafter, depicted is that application program 502 sends "disable yourself" message 420 (e.g., change password to computer, change password for disk access, erase memory (e.g., hard drive, RAM, destroy ROM), encrypt data on disk, etc.) to system 177 414.

Upon receipt of "disable yourself" message 420 application program 500 running on system 177 414 secretly sends (e.g., such that the user cannot detect the sending) "disable system" message 508 to system 177 414 hardware/software/firmware 510. Those skilled in the art will recognize that "disable system" message 508 might be a message (1) to the system hardware telling the system to self-destruct, (2) to the system firmware directing the system to reset the password necessary to access the system or the system memory (e.g., the disk drive), or (3) to the system software telling the software to make the system unusable (e.g., directing software to encrypt the data on the machine or erase the data on the machine). Hardware/software/firmware 510 the takes appropriate action to disable system 177 414 in the fashion directed. Useful background material on system password access appears in American National Standard for Information Systems standard AT Attachment-3 Interface - (ATA-3), ANSI X3.298-1997 (X3T13/2008D, Revision 7b Jan. 27, 1997), hereby incorporated by reference herein in its entirety.

The foregoing detailed description set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention is implemented via Application Specific Integrated Circuits (ASICs). In another embodiment, the present invention is implemented via modification and use of a BIOS. However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links.

The foregoing described embodiments depict different components contained within, or connected with, different other components. It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should <u>not</u> be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles used to introduce claim elements.

What is claimed is:

1. A method comprising:

detecting a communication to at least a first data processing system from at least a second data processing system;

in response to said detecting, determining whether the at least a second data processing system is stolen; and in response to said determining, disabling the at least a second data processing system when the at least a second data processing system is determined stolen wherein said disabling the at least a second data processing system further comprises disabling the at least a second data processing system by one or more actions selected from the group comprising changing the system password, changing the disk access password, erasing memory, erasing disk drive storage, encrypting data stored, and destroying at least one system component.

2. The method of claim 1, further comprising:

detecting a medium of communication to which the at least a second data processing system has access; and in response to said detecting, sending a checking-in message from the at least a second data processing system to the at least a first data processing system over the detected medium.

3. The method of claim 2, wherein said detecting a medium of communication to which the at least a second data processing system has access further comprises:

detecting an inactive telephone line.

4. The method of claim 3, wherein said detecting an inactive telephone line further comprises:

detecting a land line.

5. The method of claim 3, wherein said detecting an inactive telephone line further comprises:

detecting a wireless connection.

6. The method of claim 2, wherein said detecting a medium of communication to which the at least a second data processing system has access further comprises:

detecting an internet connection.

7. The method of claim 6, wherein said detecting an internet connection further includes:

detecting a TCP/IP connection.

8. The method of claim 1, wherein said detecting a communication to at least a first data processing system from at least a second processing system further includes:

detecting a checking-in message received via telephone.

9. The method of claim 8, wherein said detecting a checking-in message received via telephone further includes:

detecting a checking-in message received via land-line telephone.

10. The method of claim 8, wherein said detecting a checking-in message received via telephone further includes:

detecting a checking-in message received via wireless telephone.

11. The method of claim 1, wherein said detecting a communication to at least a first data processing system from at least a second processing system further includes:

detecting a checking-in message over an internet communication.

12. The method of claim 11, wherein said detecting a checking-in message over an internet communication further comprises:

detecting a checking-in message over a TCP/IP connection.

13. The method of claim 1, wherein said determining whether the at least a second data processing system is stolen further comprises:

determining a unique identifier for the at least a second data processing system; and retrieving a status associated with the unique identifier from the database.

14. The method of claim 13, wherein said retrieving a status associated with the unique identifier from the database further comprises:

retrieving a status, associated with the unique identifier from the database, from the group comprising status stolen and status okay.

15. The method of claim 1, wherein said disabling the at least a second data processing system when the at least a second data processing system is determined stolen further comprises:

sending from the at least a first data processing system to the at least a second data processing system a disable-yourself message selected from the group comprising change system password message, change disk dive password message, erase memory message, erase disk drive message, encrypt data message, and destroy data message.

16. An apparatus comprising:

means for detecting a communication to at least a first data processing system from at least a second data processing system;

means, responsive to said detecting, for determining whether the at least a second data processing system is stolen; and means, responsive to said determining, for disabling the at least a second data processing system when the at least a second data processing system is determined stolen wherein the means for disabling the at least a second data processing system further comprises a means for sending from the at least a first data processing system to the at least a second data processing system a disable-yourself message selected from the group comprising change system password message, change disk dive password message, erase memory message, erase disk drive message, encrypt data message, and destroy data message.

17. The apparatus of claim 16, further comprising:

means for detecting a medium of communication to which the at least a second data processing system has access; and means, responsive to said detecting, for sending a checking-in message from the at least a second data processing system to the at least a first data processing system over the detected medium.

18. The apparatus of claim 17, wherein said means for detecting a medium of communication to which the at least a second data processing system has access further comprises:

means for detecting an inactive telephone line.

19. The apparatus of claim 18, wherein said means for detecting an inactive telephone line further comprises:

means for detecting a land line.

20. The apparatus of claim 18, wherein said means for detecting an inactive telephone line further comprises:

means for detecting a wireless connection.

21. The apparatus of claim 17, wherein said means for detecting a medium of communication to which the at least a second data processing system has access further comprises:

means for detecting an internet connection.

22. The apparatus of claim 21, wherein said means for detecting an internet connection further includes:

means for detecting a TCP/IP connection.

23. The apparatus of claim 16, wherein said means for detecting a communication to at least a first data processing system from at least a second processing system further includes:

means for detecting a checking-in message received via telephone.

24. The apparatus of claim 23, wherein said means for detecting a checking-in message received via telephone further includes:

means for detecting a checking-in message received via land-line telephone.

25. The apparatus of claim 23, wherein said means for detecting a checking-in message received via telephone further includes:

means for detecting a checking-in message received via wireless telephone.

26. The apparatus of claim 16, wherein said means for detecting a communication to at least a first data processing system from at least a second processing system further includes:

means for detecting a checking-in message over an internet communication.

27. The apparatus of claim 26, wherein said means for detecting a checking-in message over an internet communication further comprises:

means for detecting a checking-in message over a TCP/IP connection.

28. The apparatus of claim 16, wherein said means for determining whether the at least a second data processing system is stolen further comprises:

means for determining a unique identifier for the at least a second data processing system; and means for retrieving a status associated with the unique identifier from the database.

29. The apparatus of claim 28, wherein said means for retrieving a status associated with the unique identifier from the database further comprises:

means for retrieving a status, associated with the unique identifier from the database, from the group comprising status stolen and status okay.

30. The apparatus of claim 16, wherein said means for disabling the at least a second data processing system when the at least a second data processing system is determined stolen further comprises:

means for disabling the at least a second data processing system by one or more actions selected from the group comprising changing the system password, changing the disk access password, erasing memory, erasing disk drive storage, encrypting data stored, and destroying at least one system component.

31. A program product comprising:

means for detecting a communication to at least a first data processing system from at least a second data processing system;

means, responsive to said detecting, for determining whether the at least a second data processing system is stolen;

means, responsive to said determining, for disabling the at least a second data processing system when the at least a second data processing system is determined stolen wherein said means for disabling comprises a means for disabling the at least a second data processing system by one or more actions selected from the group comprising changing the system password, changing the disk access password, erasing memory, erasing disk drive storage, encrypting data stored, and destroying at least one system component; and signal bearing media bearing said means for detecting, means for determining, and means for disabling.

32. The program product of claim 31, wherein said signal bearing media further comprises:

recordable media.

33. The program product of claim 31, wherein said signal bearing media further comprises:

transmission media.

34. The program product of claim 31, further comprising:

means for detecting a medium of communication to which the at least a second data processing system has access; and means, responsive to said detecting, for sending a checking-in message from the at least a second data processing system to the at least a first data processing system over the detected medium.

35. The program product of claim 34, wherein said means for detecting a medium of communication to which the at least a second data processing system has access further comprises:

means for detecting an inactive telephone line.

36. The program product of claim 35, wherein said means for detecting an inactive telephone line further comprises:

means for detecting a land line.

37. The program product of claim 35, wherein said means for detecting an inactive telephone line further comprises:

means for detecting a wireless connection.

38. The program product of claim 34, wherein said means for detecting a medium of communication to which the at least a second data processing system has access further comprises:

means for detecting an internet connection.

39. The program product of claim 38, wherein said means for detecting an internet connection further includes:

means for detecting a TCP/IP connection.

40. The program product of claim 31, wherein said means for detecting a communication to at least a first data processing system from at least a second processing system further includes:

means for detecting a checking-in message received via telephone.

41. The program product of claim 40, wherein said means for detecting a checking-in message received via telephone further includes:

means for detecting a checking-in message received via land-line telephone.

42. The program product of claim 40, wherein said means for detecting a checking-in message received via telephone further includes:

means for detecting a checking-in message received via wireless telephone.

43. The program product of claim 31, wherein said means for detecting a communication to at least a first data processing system from at least a second processing system further includes:

means for detecting a checking-in message over an internet communication.

44. The program product of claim 43, wherein said means for detecting a checking-in message over an internet communication further comprises:

means for detecting a checking-in message over a TCP/IP connection.

45. The program product of claim 31, wherein said means for determining whether the at least a second data processing system is stolen further comprises:

means for determining a unique identifier for the at least a second data processing system; and means for retrieving a status associated with the unique identifier from the database.

46. The program product of 45, wherein said means for retrieving a status associated with the unique identifier from the database further comprises:

means for retrieving a status, associated with the unique identifier from the database, from the group comprising status stolen and status okay.

47. The program product of claim 31, wherein said means for disabling the at least a second data processing system when the at least a second data processing system is determined stolen further comprises:

means for sending from the at least a first data processing system to the at least a second data processing system a disable-yourself message selected from the group comprising change system password message, change disk dive password message, erase memory message, erase disk drive message, encrypt data message, and destroy data message.

* * * * *